US008805826B2

(12) United States Patent
Pauchet et al.

(10) Patent No.: US 8,805,826 B2
(45) Date of Patent: Aug. 12, 2014

(54) SYSTEM AND METHOD FOR PROCESSING COMPLEX QUERIES

(75) Inventors: David Pauchet, Mougins (FR); Benoît Janin, Biot (FR); Rudy Daniello, Nice (FR); Thierry Dufresne, Opio (FR); Marc Patoureaux, Grasse (FR)

(73) Assignee: Amadeus, S.A.S., Sophia Antipolis (FR)

( * ) Notice: Subject to any disclaimer, the term of this patent is extended or adjusted under 35 U.S.C. 154(b) by 0 days.

(21) Appl. No.: 13/065,619

(22) Filed: Mar. 24, 2011

(65) Prior Publication Data

US 2012/0239636 A1    Sep. 20, 2012

(30) Foreign Application Priority Data

Mar. 17, 2011    (EP) .................................... 11305300

(51) Int. Cl.
*G06F 17/30*    (2006.01)
*G06Q 10/02*    (2012.01)

(52) U.S. Cl.
CPC .... *G06F 17/30861* (2013.01); *G06F 17/30427* (2013.01); *G06Q 10/025* (2013.01)
USPC ............ 707/723; 707/706; 707/748; 707/758

(58) Field of Classification Search
CPC .................... G06F 17/30427; G06F 17/30286; G06F 17/30867; G06F 17/30545; G06F 17/30864; G06F 17/30908; G06F 17/30; G06F 17/3053; G06F 17/30557; G06F 17/30566; G06F 17/30569; G06F 17/30572; G06Q 10/02
USPC ............. 707/1, 100, 706, 705, 713, 718, 736, 707/759, 763, 765, 776
See application file for complete search history.

(56) References Cited

U.S. PATENT DOCUMENTS

| | | | |
|---|---|---|---|
| 6,442,526 B1 | 8/2002 | Vance et al. | 705/5 |
| 6,839,714 B2 * | 1/2005 | Wheeler et al. | 707/999.1 |
| 7,644,361 B2 * | 1/2010 | Wu et al. | 715/273 |
| 7,693,900 B2 * | 4/2010 | Wilmering et al. | 707/713 |
| 7,716,233 B2 * | 5/2010 | Xiong | 707/759 |
| 7,783,506 B2 * | 8/2010 | Vaughan et al. | 705/5 |
| 7,856,462 B2 * | 12/2010 | Huang et al. | 707/713 |
| 7,979,457 B1 * | 7/2011 | Garman | 707/768 |
| 8,041,728 B2 * | 10/2011 | Dettinger et al. | 707/766 |
| 8,078,647 B2 * | 12/2011 | Liang et al. | 707/802 |
| 8,200,549 B1 * | 6/2012 | Crean et al. | 705/26.64 |
| 8,249,885 B2 * | 8/2012 | Berkowitz et al. | 705/1.1 |
| 2003/0055690 A1 | 3/2003 | Garback | 705/5 |
| 2007/0260495 A1 * | 11/2007 | Mace et al. | 705/5 |
| 2008/0281802 A1 * | 11/2008 | Peterson et al. | 707/4 |
| 2009/0150343 A1 * | 6/2009 | English et al. | 707/3 |
| 2009/0265392 A1 * | 10/2009 | Taneike et al. | 707/200 |
| 2010/0299336 A1 * | 11/2010 | Bergstraesser et al. | 707/759 |
| 2012/0136683 A1 * | 5/2012 | Wallace et al. | 705/6 |

* cited by examiner

FOREIGN PATENT DOCUMENTS

EP    1 840 806 A1    3/2006

*Primary Examiner* — Jay Morrison
*Assistant Examiner* — Dangelino Gortayo
(74) *Attorney, Agent, or Firm* — Wood, Herron & Evans LLP

(57) ABSTRACT

The invention relates to a method and system for processing complex queries each corresponding to a plurality of components to be combined. Elements corresponding to these components are searched. The elements are of different element types and are originally described by definition data having heterogeneous data structures. A conversion step transforms the heterogeneous definition data into converted definition data of one single format. An engine then retrieves elements and builds associations of elements matching the query parameters based on the converted definition data, thereby providing with a reply to the query in an optimized manner.

15 Claims, 7 Drawing Sheets

SYSTEM AND METHOD FOR PROCESSING COMPLEX QUERIES

TECHNICAL FIELD

The present invention relates in general to the field of data processing. More specifically it concerns the handling of complex queries which here means that each query involves to search for and to retrieve from a database a multiplicity of items to be associated together to present to the user sets of said items combined together in a logical way.

One non limitative application is the processing of search requests in the field of the travel and tourism industry when a user wishes to book a bundle of services, such as a combination of air travel services with hotel accommodation and/or car rental which are very different components by nature.

BACKGROUND

Today's search systems are well efficient for processing requests for one type of items. In the travel industry field, search engines are now widely used and return travel solutions are sent in reply to an end user request. This is the case for engines dedicated to the airline industry such as low fare search engines providing the user with a set of low price flight solutions to be displayed on a friendly graphical interface.

The success of these techniques led the industry to propose computerized tools for enlarging the scope of the searches, for returning packages of products. This is particularly the case in the travel industry where the customer often needs a bundle of services when traveling. Products to be packaged can include flight tickets, hotel nights, and tourism activities.

Figure 1:
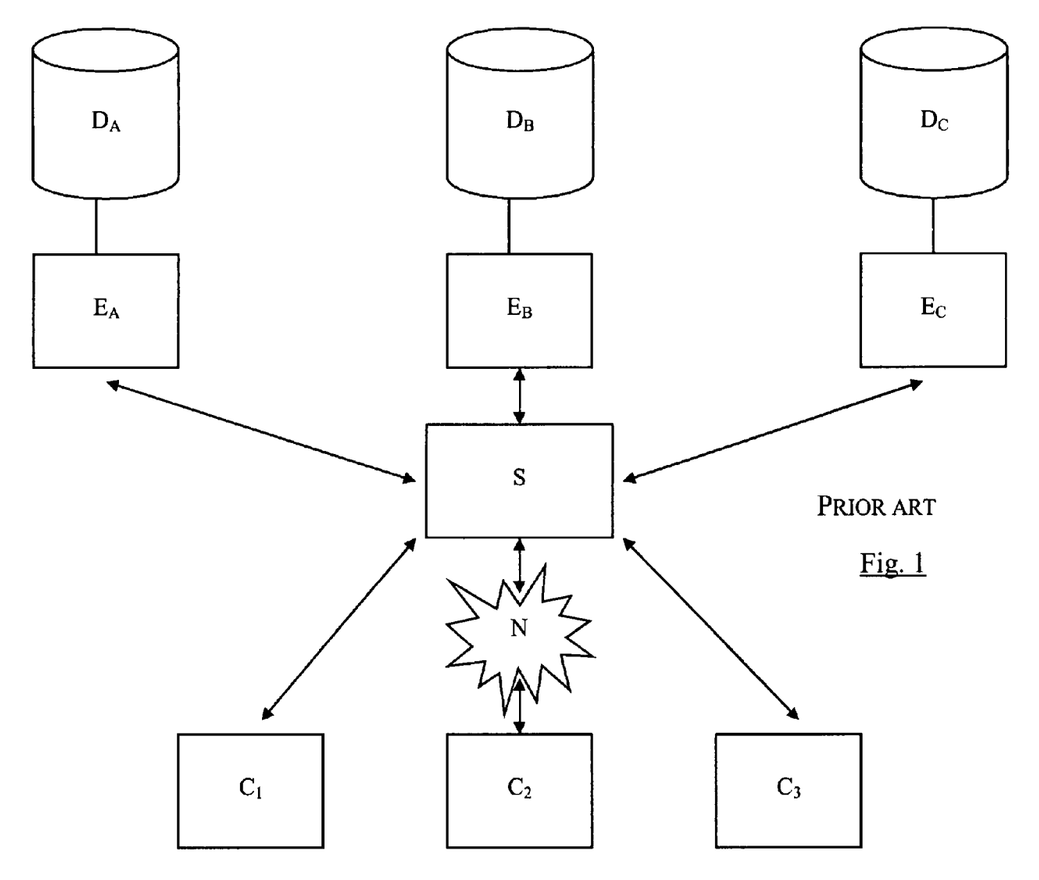
FIG. 1 illustrates an example of a state-of-the-art system for aggregating results of queries.

FIG. 1 depicts how a state-of-the-art technique builds product packages. A plurality of data repositories Da, Db and Dc are used and each stores travel products of one type. By way of example, Da, Db and Dc respectively contain information about air seats, about hotel rooms and about car rental services. A server S is used as a central node of the system. It receives user requests and returns travel packages solutions from end users over a network such as a wide area network preferably the internet. Upon receipt of a request, the server S communicates a plurality of individual queries each targeting one search engine Ea, Eb, Ec respectively associated with one of the repositories Da, Db, Dc. Local and independent searches are performed at the level of the search engines Ea, Eb, Ec and products are returned to the server S. The later server then aggregates the products to construct travel packages made of a plurality of products.

Such a search system is complex and involves multiple hardware/software computer resources.

SUMMARY

The invention aims at overcoming at least some of the drawbacks of current techniques for processing complex queries.

One technical problem the invention intends to solve is to optimize the processing of complex queries where multiple items of different natures need to be searched and combined to produce a response to a user request. The invention provides an efficient solution for searches based on heterogeneous data and triggered by complex queries.

In a more specific manner, the present invention relates to a method for processing a data search based on a complex query for at least one set of combined elements matching search parameters, at least two of the combined elements being of different element types. Said method preferably comprises the query processing steps of:

i) obtaining definition data of elements of a least two different element types, said definition data having heterogeneous data structures, said definition data comprising at least one element fare for each element,
ii) converting said definition data into converted definition data sharing one single generic data structure,
iii) receiving the complex query at a search engine,
iv) at the search engine, finding elements of at least two different element types whose converted definition data matches the query and combining said elements, the step of combining comprising:
   associating element fares of said elements,
   building at least one fared set of combined elements based on association of element fares
v) and returning at least one fared set of combined elements.

The at least one set of claims combined elements is/are preferably the best set(s) with regard to evaluation parameters such as, but not systematically, the price of the set. In the later case, the best set(s) is (are) the cheapest one(s).

Thanks to the invention, searches can be performed on the basis of very heterogeneous data sources. Heterogeneous data structures here means that at least two of the element types are defined by data of different data structures. The presentation of the data and/or the data fields describing the elements of said element types are thus different from one source of data to at least another and this means that no single search engine is normally capable of searching among these heterogeneous sources. Whereas current systems cope with this problem by multiplying the search engines (one for each source) and by implementing post-processing means to aggregate the results obtained from the plurality of engines, the invention dramatically saves computer resources since one engine is sufficient. In addition the engine directly produces element associations without requiring a post step of aggregation. And the results returned by the engine are much more reliable. This is because the engine directly works with elements described by definition data of the same data structure so that the search and the combination of the elements are integrated within the same process.

Further optional features which may be used cumulatively or alternatively are introduced hereafter:
   the method comprises the steps of storing the definition data in a repository and of making the search engine access the repository.
   the step of combining comprises checking if the association of element fares complies with combinatory rules.
   the complex query includes data defining a plurality of components derived from the search parameters and for which at least one element is to be searched for.
   the step of combining comprises:
      for each component, retrieving a set of matching element,
      associating matching element fares,
      checking if the association of the matching element fares complies with the combinatory rules,
      if the association complies with the combinatory rules, validating the association of the matching element fares,
      if the association fails to comply with the combinatory rules, invalidating the association of the matching element fares.
   the method comprises repeating the preceding steps with at least a further association of matching element fares.

it comprises defining a plurality of components derived from the search parameters and for which at least one element is to be searched for, and defining, for each component, at least one element type for which at least one element is to be searched for.

the following steps are processed:

executing the query processing steps for a plurality of queries to build associations of matching elements, upon receipt of a request of an end user, retrieving at least one of said associations which matches the request, checking if the at least one of said associations complies with the combinatory rules, if the at least one of said associations complies with the combinatory rules, validating the at least one of said associations, if the at least one of said associations fails to comply with the combinatory rules, invalidating the at least one of said associations, returning to the end user the at least one of said associations if it is a validated one.

the following steps are executed:

executing the query processing steps for a plurality of queries to build associations of matching element fares, building associations of matching elements based on the associations of matching element fares;

checking if the associations of matching elements comply with the combinatory rules, for each of the associations of matching elements, if it complies with the combinatory rules, validating said association, and it fails to comply with the combinatory rules, invalidating said association, storing the validated associations or at least some of them; selected according to evaluation criteria, such as the price, to store only the best validated associations, upon receipt of a request of an end user, retrieving at least one of said best validated associations which matches the request, returning to the end user the at least one of said best validated associations.

the definition data comprises fare data, availability data and application rule data.

the element types include at least two of: air travel element type, railway travel element type, accommodation element type, car rental element type.

the method is performed as a result of execution of computer software by at least one data processor, the computer software being stored in a non-transitory computer-readable memory medium, which here comprises any computer readable memory such as ROM or RAM memories.

The present invention further relates to a system for processing a data search based on a complex query comprising means for executing the method of the invention.

According to a preferred embodiment, the search engine is a low fare search engine.

This system may comprise computer software stored in a non-transitory computer-readable memory medium that is executed by at least one data processor that comprises part of the system.

The present invention also relates to a computer program product storing a computer program comprising instructions adapted to perform the method of the invention.

BRIEF DESCRIPTION OF THE DRAWINGS

The present invention will now be described in details with reference to the drawings for the purpose of illustrating the preferred embodiment.

DETAILED DESCRIPTION

The invention can be implemented with computer hardware and software means. It can include a server side where the processing of data takes place. This server side—which may be comprised of single or plural computer devices—preferably communicates via network resources with at least one remote user device such as but not exclusively a desktop computer, a smart phone or the like. Communication networks used for the data transmission may include local area networks and/or wide area networks such as the internet.

A few definitions are given hereafter:

"end user request" or request here means a search request sent from one device of the system and intending to obtain results corresponding to search parameters. In a preferred embodiment the request is based on search parameters at least partially inputted by a user—such as a remote user communicating with other parts of the system via a network—at a user device. In one preferred application, the request is for travel arrangement solutions comprising a plurality of items (see hereafter "component") to be associated.

"query" here means a message sent to a search engine and specifying search criteria. Depending on the working context queries can be based or derived from requests of end users or be generated automatically at the server side without being directly linked to an actual traffic of user requests.

"component" here means an item of an association of items used to form a solution in reply to a user request. In the case of travel arrangements, the components are typically segments each satisfying one portion of the travel arrangement defined by the search parameters. By way of example, a complex travel request may include an outbound travel component, an accommodation component and an inbound travel component. One component may include a set of items which are grouped such that they form a single entity to be searched for. For example, consecutive hotel nights may consist in one single component.

"element type" here means a generic class definition of elements sharing the same nature or structure. In the field of the travel and tourism industry, an element type is typically a sort of services provided to a customer such as air travel services, railways travel services, hotel accommodation services, car rental services, lunch services, and any other service a customer may need during a travel period. Element types are used to classify elements which are the unitary bricks used to build a complete solution matching the complex request. In a preferred embodiment elements are products that can be combined together to fulfill the needs expressed by the user in the request. By way of example an element can be: an air travel leg (corresponding to one flight between an origin and a destination), a car rental service, a hotel (or other accommodation) night (or a set of nights), a taxi reservation, a travel segment other than an air segment (railways, bus . . . ). Components can match with one element type or plural element types. For example a travel between an origin location and a destination location, corresponding to one component of a request can lead to a search for flights and for trains matching the search parameters.

The detailed description of a preferred embodiment is given hereafter in the case of travel products.

We hereby show how a typical travel product is structured in the air industry field. The airlines industry adopts a quite complex definition of the travel products to be ticketed. This definition is organized around a fare definition concept which not only gives price amount information about a travel product but also details about the application of the fare, availability indication on top on more general data (origin and destination, cabin class and service level . . . ).

One aspect of these data is the application rules an example of which is provided hereafter: within each rule, there are categories that are designed by a number. A category describes the conditions in a given area. For example, we have: 1→Eligibility . . . 19→Children discount . . . Etc. Inside a category, there are items called Records 2 hereafter also simply called records. Each of them is composed of a set of elements called matching elements (loc 1, loc2, effective and discontinued dates . . . ) that define which record 2 is applicable for a given trip. A record 2 contains a string of records 3. Each record 3 defines a given set of restrictions for the category.

Here is an example:

```
Rule AF01
    Category 1 - Eligibility
        Record 2
            Between Paris and London
            String with 2 records 3 linked with OR
                Passenger must be a soldier
                OR
                Passenger must be a clergyman
    Category 12 - Surcharges
        Record 2
            Between Paris and London
            String with 1 record 3
                If passenger flights in Business class
                he will pay a surcharge of 2000$
```

This shows the complexity of definition of the elements when they are made of air travel products defined with fares. In addition the data structure and thus the element types may be different from one airline carrier or travel provider to another. And other travel elements (such as railways tickets, car rental or hotel rooms) have different definition data structures so that one technical problem is to work with the various data structures within the same process of response to a query.

Figure 2:
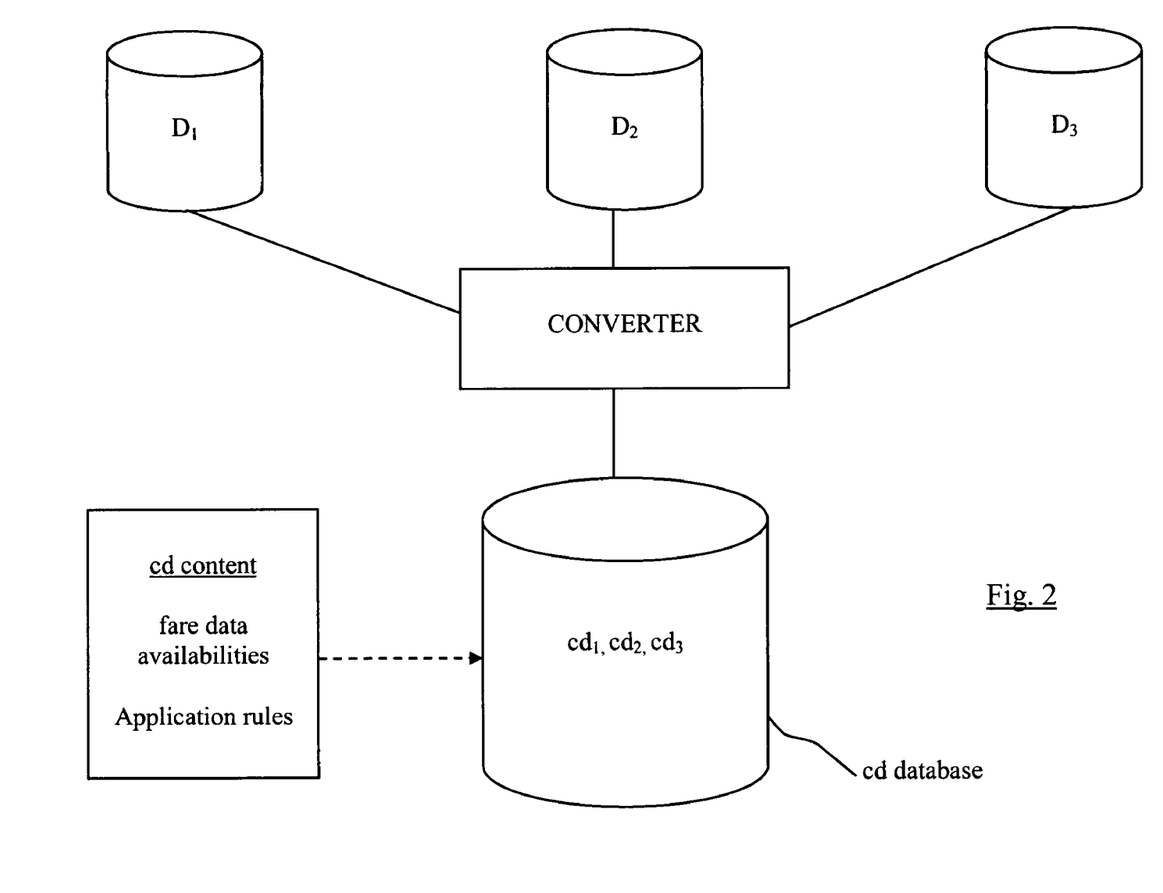
FIG. 2 shows a preferred embodiment of one aspect of the invention related to the conversion of definition data.

FIG. 2 depicts a first parts of the invention corresponding to a conversion stage. D1, D2 and D3 represent data repositories—the number of which is not limited—and containing definition data of elements. By way of example Air travel elements are stored in D1, Hotel room elements are stored in D2 and car rental elements are stored in D3. The definition data of the elements stored in D1, D2 and D3 have different data structures.

For example, Air travel elements may be of an element type defined by:
fare data
availability data
rules
TLA data, i.e. data coming from low-cost carriers
OAG data, i.e. flight data Hotel room elements of D2 source may be of an element type defined by:
one or plural fare data
hotel and hotel rooms definition data
rules And car rental elements of D3 may be of an element type defined by:
one or plural fare data
cars definition
rules All these elements correspond to heterogeneous items which do not share a generic data structure. Typically the data structure of each element type is specified by the administrator of the provider of the considered element.

According to the invention, a conversion of the definition data of the elements is performed. A converter as depicted in FIG. 2 may be used for that purpose. It is configured to output converted definition data so that all the elements are described in a single generic data structure.

According to a preferred embodiment, the generic data structure comprises:
identification data describing the element type (such as air, car, hotel . . . ) and possibly a brand associated to the element.
At least, one element fare set composed of:
Fare data (fare amount)
Availabilities
Application rules Application rules may be divided in two categories:
internal rules which tell the conditions of application of an element fare; for example, rules may include the age of the requestor;
external rules, which are conditions of element fare application constrained by the presence or non-presence of another kind of element in the association to be built (e.g. a hotel fare which requires to have flown on a specific airline). The external rules specify whether the combinability is possible with:
such element,
such brand,
such fare,
or a combination of these criteria.

The external rules are used to check the validity of association between various elements. They are hereafter called combinatory rules. In one embodiment the combinatory rules are stored in the same memory area as the other application rules. In an alternative embodiment, they are stored at a different level. They can be administered by a person differing from the provider of the elements. For example, combinatory rules may be defined by the administrator of a web based entity such as an online travel agency.

If a combinatory rule is not filed in the generic format, the converter will adapt it the same way it adapts the rest of the element definition data.

For combinatory rules, the generic data format can be similar to the category 10 of rules as defined by IATA (International Air Transport Association) for combinability of air fares.

Here is a further exemplified case of combinatory rules for a car rental element having a promotional fare:
Combination with Hotel Elements
"The fare can only be used if car transportation is form or towards an IBIS® or MERCURE® hotel.
Combination with Flight Elements
"The fare can only be used if car transportation is from or towards an AIR FRANCE® flight arriving between 8:00 am and 11:00 am or between 14:00 pm and 17:00 pm.

The results of the conversion step performed by the converter may be stored in an appropriate repository such as the c d database depicted in FIG. 2 and containing converted definition data of elements ($cd_1$, $cd_2$, $cd_3$).

Figure 3:
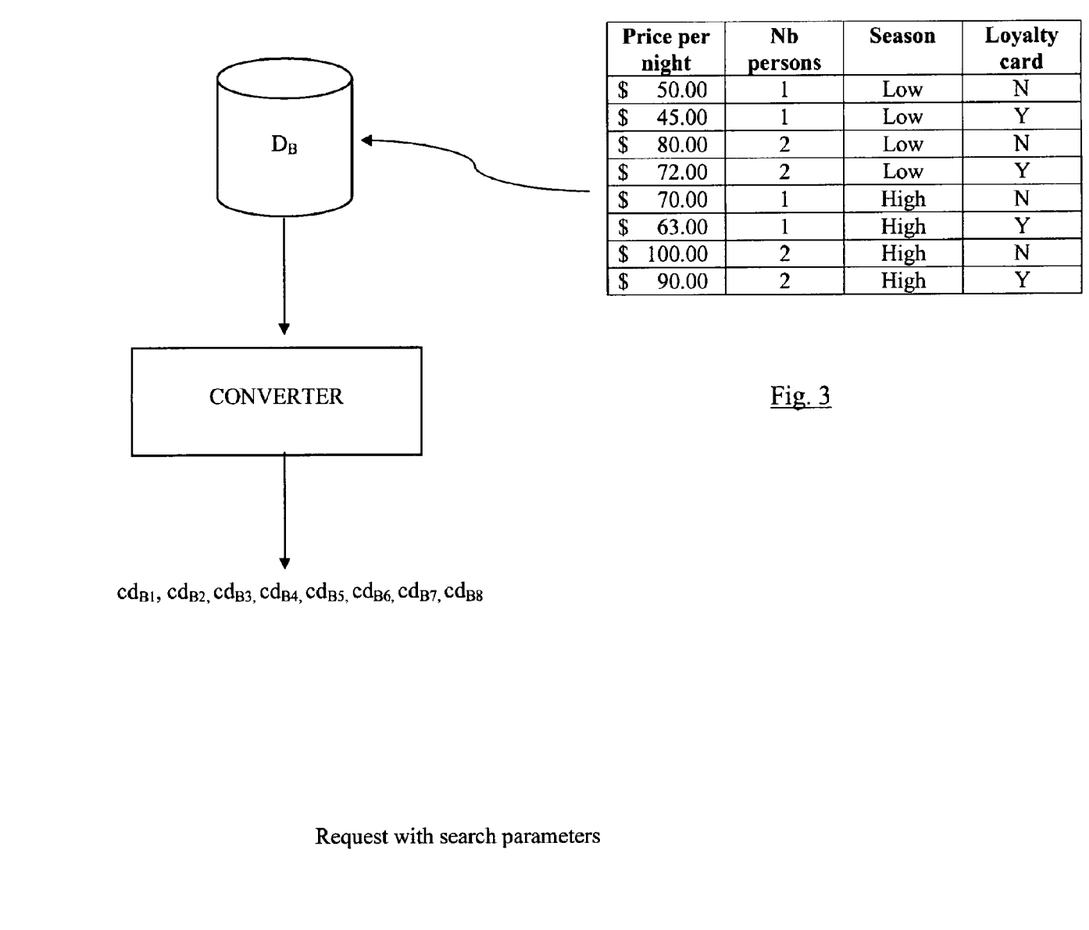
FIG. 3 depicts an example of conversion of definition data.

FIG. 3 illustrates a further example of the definition data conversion step. In this case, hotel elements are subject to a format transformation from the structure depicted in the table of FIG. 2 to a converted format in which as many converted elements are created as there are lines in the table.

Figure 4:
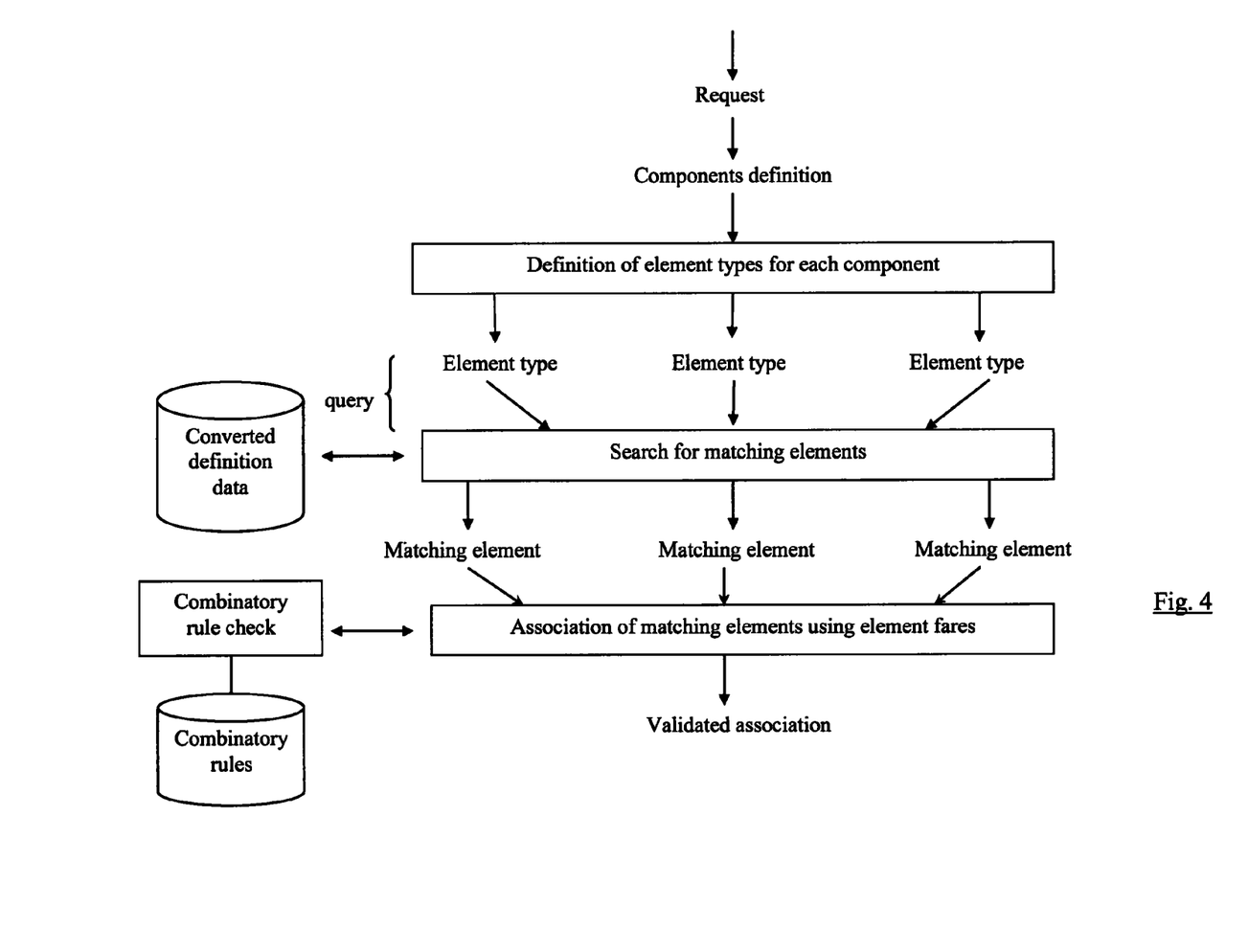
FIG. 4 is a diagram illustrating steps of the method.

Turning now to FIG. 4, an embodiment is illustrated with a data flow starting from the receipt of a user request to the provision of results.

The end user—such as a potential traveler—enters search parameters by means of a computer device. Preferably this step uses a graphical user interface displayed via a browser. Not all the search parameters useful for processing the request need to be entered by the user. Some parameters may be determined by the system based, for example, on default values or on values deduced from the environment of the user request (e.g. an origin location may be defined as the user device location determined by a satellite positioning system or an IP address).

In one embodiment, the end user connects to an airline or other provider-website and can use a product selection button to chose components he wishes to book. Once a product is selected, the graphical user interface requests the user enters more details on the corresponding component. By way of example, if the component is an air product, it leads the interface to request the departure and arrival cities as well as the dates or time windows. Then the user is offered to add another component. Similarly, each new component involves the input of particulars for this part of the request.

For illustration purpose, consider a request form an origin to New-York city with accommodation, then the input of the request would involve three components: air (outbound), hotel, air (inbound), corresponding to two element types.

Preferably the request is transmitted over a communication network to a server sideNext, the definition of the relevant element types and the search parameters are used to define a query to be processed by a search engine to search for matching elements. The engine may be a conventional search engine such as a fare shopping engine used in transactional environments to return priced products. More precisely the engine may be a low fare search engine aimed at returning low price solutions. Thanks to the invention only one engine—and of a conventional kind—is sufficient to process the query which is however complex since it involves plural element types.

To search for matching elements, the engine accesses converted definition data obtained according to the previously described conversion method.

The processing of the queries is preferably driven by the element fares of the elements. As previously indicated, each element is defined by general data (identification of the element; general definition data . . . ) and by at least one (but often plural) element fares. The association is here based on the element fares. Upon receipt of a query, candidate elements are searched for each component of the query. For the found elements, the system starts an association mechanism in which element fares of the found elements are associated. The system discards associations that failed (when their rules are not compatible) and generates successful element fares associations. The later associations are then used to build sets of combined elements to which a fare is assigned deriving from the association of the element fares. Such sets of combined elements are thus called fared sets of combined elements.

It should be noted that one element can be the source of series of element fares associations. For example, one element having one element fare A and one element fare B lead to associations based on A and or B.

In one embodiment, the best elements found for each component are combined.

However other association policies may be pursued.

Associations of elements must comply with the combinatory rules. In a preferred embodiment, this check is done dynamically with the association process: starting from one matching element fare (corresponding to an element included in a set of elements matching one component of the request), a second matching element fare (corresponding to an element included in a set of elements matching another component of the request) is considered. Their combinability is checked by accessing the combinatory rules. This check is depicted on FIG. 5.

Figure 5:
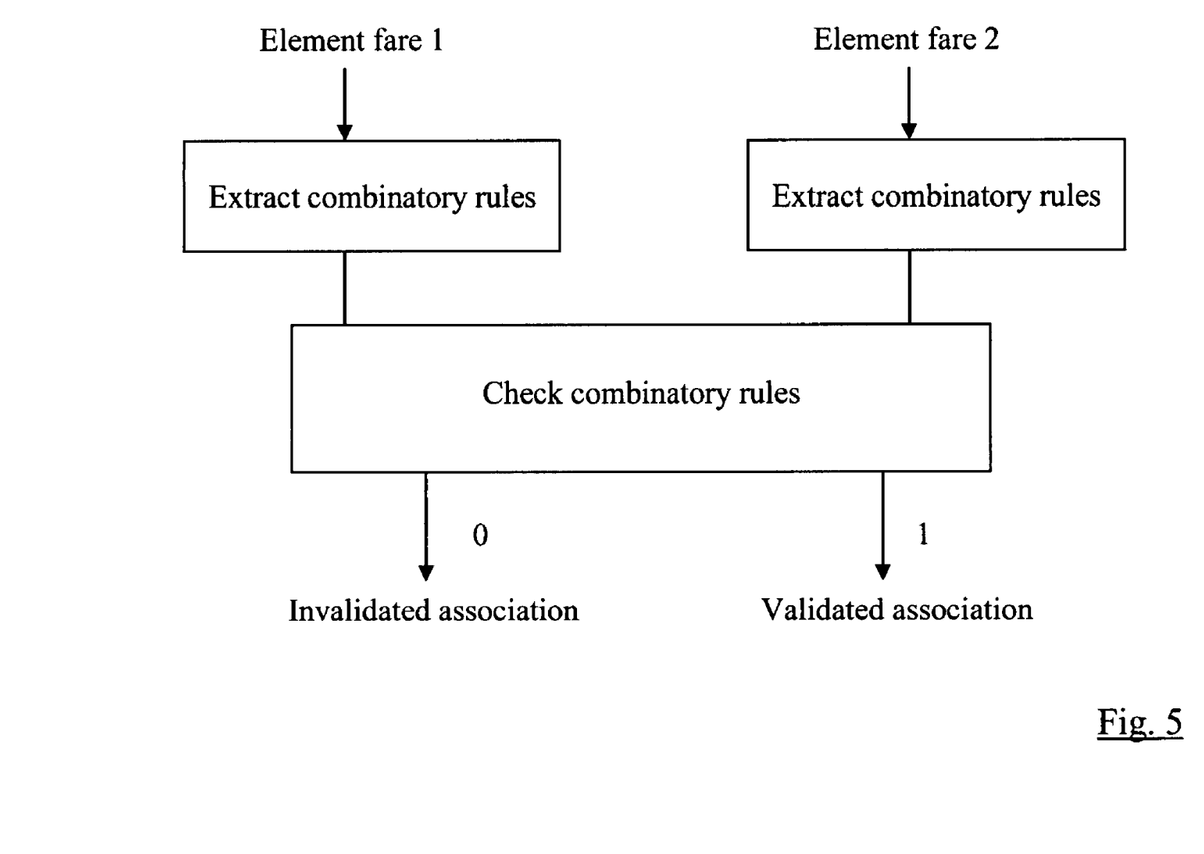
FIG. 5 shows a checking step.

If the association is invalidated, it is withdrawn from consideration by the engine which continues its search.

If the association is validated, the engine then tries to combine the association with another matching element fare of an element corresponding to still another component of the request. Again combinatory rules are checked and the process continues until a complete association of matching elements fitting the whole request has be determined and checked against the combinatory rules.

Returning to FIG. 4, the output of the process consists in at least one validated association of elements complying with the search parameters.

Figure 6:
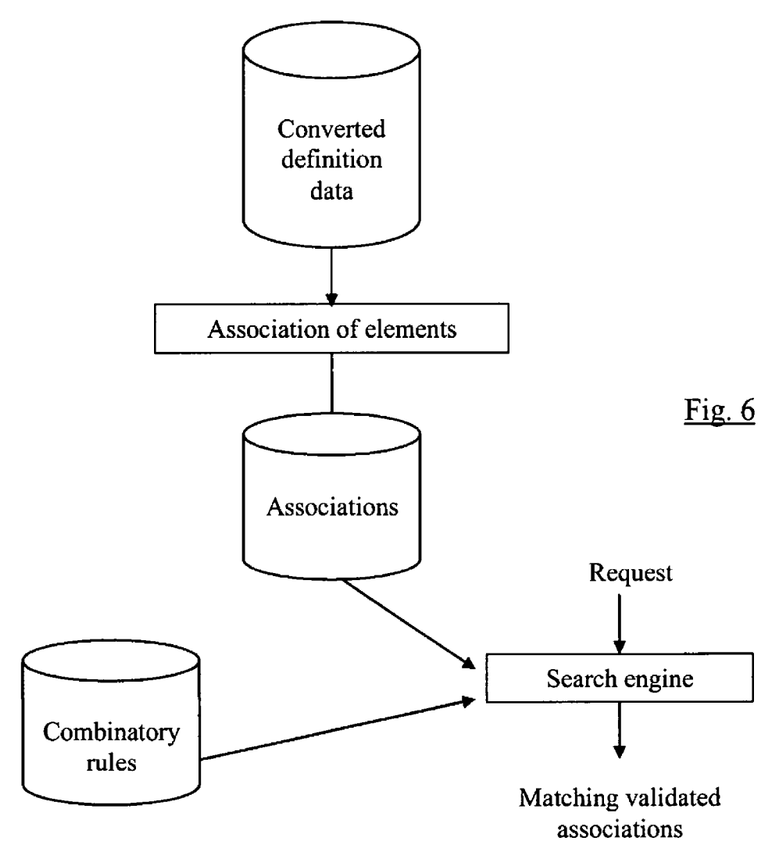
FIG. 6 illustrates an embodiment of the invention with the construction of a database of associations of elements.

Another flow is illustrated in FIG. 6 for processing the user request.

According to this embodiment, associations of elements are built during a construction stage. They are stored for future use. This corresponds to a pre-process in which massive queries are generated at the server side without direct link to an actual user request.

The queries are processed by an engine which can be the same as the engine described in reference to FIG. 4. At end user transaction time, another engine will parse the database with all cheapest associations, and discard the ones invalid due to non-combinability.

The stored associations are accessed by the second search engine upon receipt of a user request. Matching associations are then confronted to the combinatory rules and non-complying associations are invalidated. Validated associations are returned to the user. From a user point of view, the response time is decreased thanks to this embodiment. A drawback is that all calculated associations may be invalidated by this post-filtering.

Figure 7:
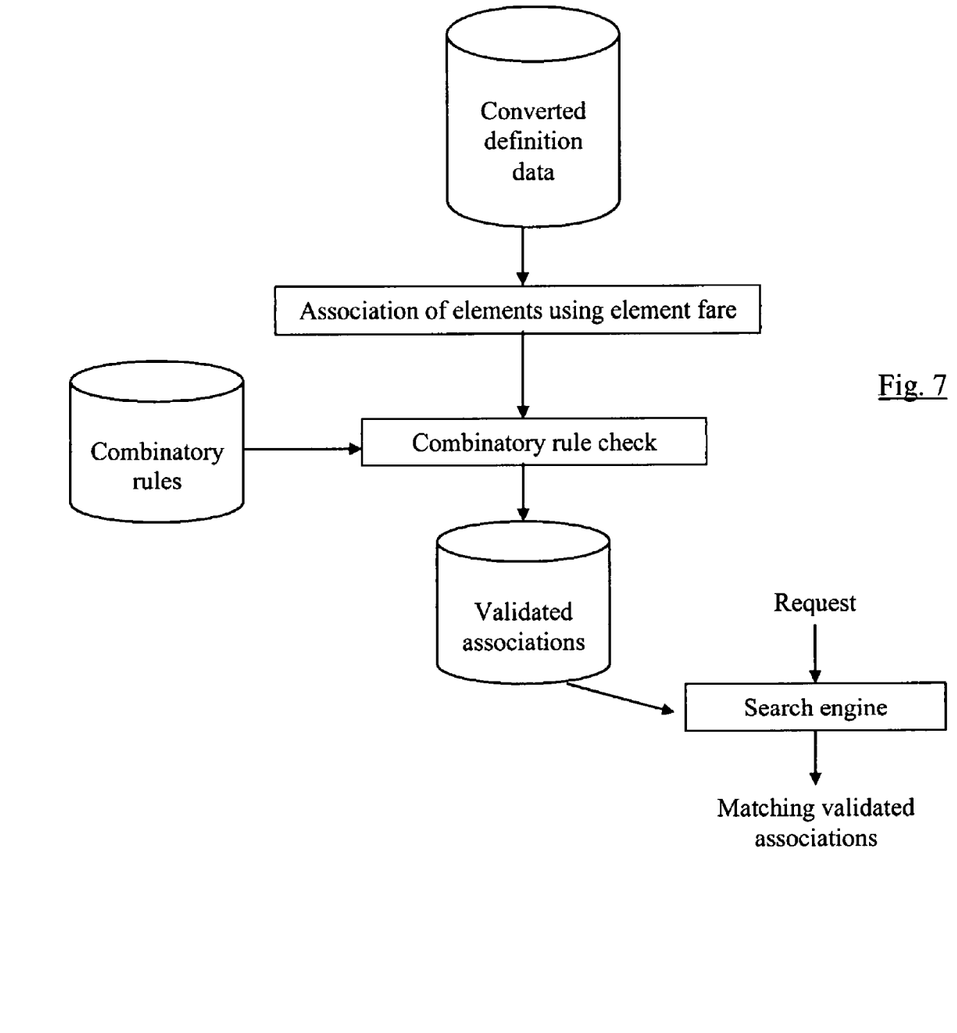
FIG. 7 shows an alternative to the embodiment given in FIG. 6.

A variation of the embodiment of FIG. 6 is given in FIG. 7. Associations of elements are built in the same manner but they are immediately checked against the combinatory rules. This leads to validated associations then stored for future use. Upon receipt of a request, the search engine accesses the validated associations and tries to find associations matching the search parameters of the user request. Such matching validated associations can be returned to the user. From a user point of view, the response time is also decreased thanks to this embodiment.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

The invention claimed is:

1. A method for processing a search query, the method comprising:
    obtaining definition data comprising data elements from first and second data repositories at a processor, wherein the data elements of the definition data from the first data repository have a first data structure that differs from a second data structure of the data elements of the definition data from the second data repository, the first data structure comprises a first travel product type and one or more first element fares, and the second data structure comprises a second travel product type different from the first travel product type and one or more second element fares;
    converting the definition data from the first data repository and the definition data from the second data repository with the processor into converted definition data sharing one single generic data structure;
    storing the converted definition data in a database;
    after the converted definition data is stored in the database, receiving the search query at a search engine;
    querying the database with the search engine to find the data elements of the first and second travel product types for which the converted definition data matches the search query;
    associating the one or more first element fares and the one or more second element fares of the data elements of the first and second repositories based upon compliance with combinatory rules;
    building at least one fared set of data elements of the first travel product and the data elements of the second travel product based on the association of the element fares that comply with the combinatory rules; and
    for a first association of first and second element fares:
        determining if the first association complies with at least one combinatory rule;
        if the first association is determined to comply with the at least one combinatory rule, validating the first association; and
        if the first association is determined to not comply with the at least one combinatory rule, invalidating the first association such that the first association is excluded from the at least one fared set.

2. The method of claim 1 wherein the query includes data defining a plurality of components derived from search parameters and for each of which at least one data element is to be searched for.

3. The method of claim 1 comprising:
    defining a plurality of components derived from the search parameters and for which at least one element is to be searched for; and
    defining, for each component, the first and second travel product types for which at least one data element is to be searched for.

4. The method of claim 1 wherein the definition data comprises fare data, availability data, and application rule data.

5. The method of claim 1 wherein the first and second product types include at least two of: air travel element type, railway travel element type, accommodation element type, and car rental element type.

6. A computer program product comprising:
    a non-transitory computer-readable memory medium; and
    a computer program stored on the medium, the computer program comprising instructions configured to be executed by at least one data processor to process a search query, the instructions configured to:
        obtain definition data comprising data elements from first and second data repositories, wherein the data elements of the definition data from the first data repository have a first data structure that differs from a second data structure of the data elements of the definition data from the second data repository, the first data structure comprises a first travel product type and one or more first element fares, and the second data structure comprises a second travel product type and one or more second element fares;
        convert the definition data from the first data repository and the definition data from the second data repository into converted definition data sharing one single generic data structure;
        store the converted definition data in a database;
        after the converted definition data is stored in the database, receive the data search query at a search engine;
        query the database with the search engine to find the data elements of the first and second travel product types for which the converted definition data matches the search query;
        associate the element fares for the converted definition data that matches the search query based upon compliance with combinatory rules;
        build at least one fared set of data elements of the first travel product and the data elements of the second travel product based on the association of the element fares that comply with the combinatory rules; and
        for a first association of first and second element fares:
            determine if the first association complies with at least one combinatory rule;
            if the first association is determined to comply with the at least one combinatory rule, validate the first association; and
            if the first association is determined to not comply with the at least one combinatory rule, invalidate the first association such that the first association is excluded from the at least one fared set.

7. The computer program product of claim 6 wherein the query includes data defining a plurality of components derived from search parameters and for each of which at least one data element is to be searched for.

8. The computer program product of claim 6 wherein the instructions are further configured to:
    define a plurality of components derived from the search parameters and for which at least one element is to be searched for; and
    define, for each component, the first and second travel product types for which at least one data element is to be searched for.

9. The computer program product of claim 6 wherein the definition data comprises fare data, availability data, and application rule data.

10. The computer program product of claim 6 wherein the first and second product types include at least two of: air travel element type, railway travel element type, accommodation element type, and car rental element type.

11. A system for processing a data search query, the system comprising:
- a first data repository including definition data comprising a plurality of data elements with a first data structure, the first data structure including a first travel product type and one or more first element fares;
- a second data repository including definition data comprising a plurality of data elements with a second data structure that differs from the data structure of the data elements of the first definition data, the second data structure including a second travel product type and one or more second element fares;
- a database; and
- at least one processor coupled with the first and second data repositories, wherein the at least one processor is configured to:
  - obtain the definition data from the first repository and the definition data from the second data repository, convert the definition data from the first data repository and the definition data from the second data repository into converted definition data sharing one single generic data structure, and store the converted definition data in the database;
  - receive the data search query, query the database to find the data elements of the first and second travel product types for which the converted definition data matches the search query, associate the element fares for the converted definition data that matches the search query based upon compliance with combinatory rules, and build at least one fared set of data elements of the first travel product and the data elements of the second travel product based on the association of the element fares that comply with the combinatory rules; and
  - for a first association of first and second element fares:
    - determine if the first association complies with at least one combinatory rule;
    - if the first association is determined to comply with the at least one combinatory rule, validate the first association; and
    - if the first association is determined to not comply with the at least one combinatory rule, invalidate the first association such that the first association is excluded from the at least one fared set.

12. The system of claim 11 wherein the query includes data defining a plurality of components derived from search parameters and for each of which at least one data element is to be searched for.

13. The system of claim 11 wherein the at least one processor is further configured to:
- define a plurality of components derived from the search parameters and for which at least one element is to be searched for; and
- define, for each component, the first and second travel product types for which at least one data element is to be searched for.

14. The system of claim 11 wherein the definition data comprises fare data, availability data, and application rule data.

15. The system of claim 11 wherein the first and second product types include at least two of: air travel element type, railway travel element type, accommodation element type, and car rental element type.

* * * * *

UNITED STATES PATENT AND TRADEMARK OFFICE
CERTIFICATE OF CORRECTION

| | | |
|---|---|---|
| PATENT NO. | : 8,805,826 B2 | Page 1 of 1 |
| APPLICATION NO. | : 13/065619 | |
| DATED | : August 12, 2014 | |
| INVENTOR(S) | : David Pauchet | |

It is certified that error appears in the above-identified patent and that said Letters Patent is hereby corrected as shown below:

In the Specification:

At column 1, line number 12, change "non limitative" to --non-limitative-- and at line number 47 change "later" to --latter--

At column 2, line number 22, change "later" to --latter-- and at line number 29 change "are" to --is-- and at line 38 "And" starts a new paragraph

At column 3, line number 44 change "." to --,-- and at line number 46 change "." to --,-- and at line number 49 change "." to --,--

At column 5, line number 60, change "parts" to --part--

At column 7, line number 4, change "form" to --from-- and at line number 43 change "form" to --from--

At column 8, line number 6, change "later" to --latter-- and at line number 13 change "lead" to --leads-- and at line number 36 change "be" to --been--

Signed and Sealed this
Twenty-third Day of December, 2014

Michelle K. Lee
*Deputy Director of the United States Patent and Trademark Office*